Figure 1:
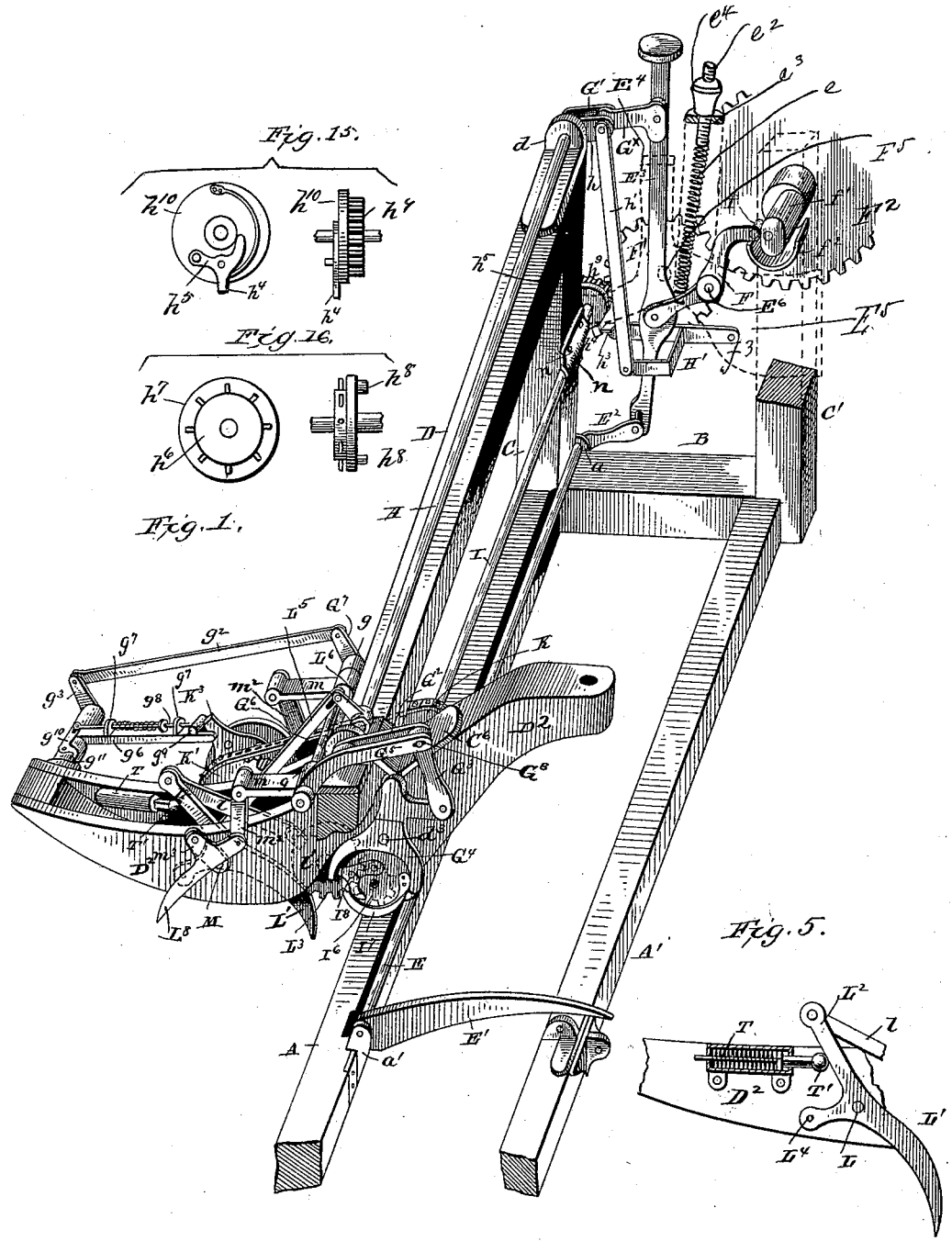

(No Model.) 10 Sheets—Sheet 2.

M. L. NICHOLS.
GRAIN BINDER.

No. 395,991. Patented Jan. 8, 1889.

WITNESSES
Edwin T. Yewell
Jos. A. Ryan

INVENTOR
M. L. Nichols
by Alex Mahon
Attorney.

(No Model.) 10 Sheets—Sheet 3.
M. L. NICHOLS.
GRAIN BINDER.
No. 395,991. Patented Jan. 8, 1889.
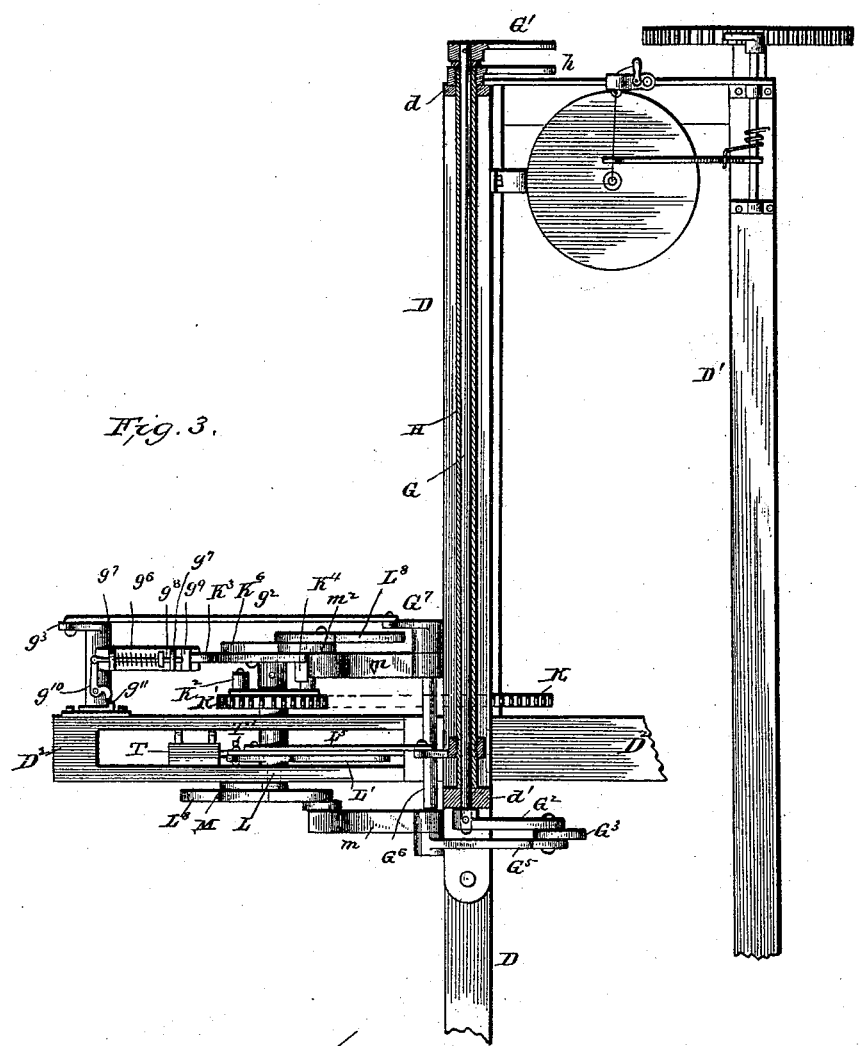
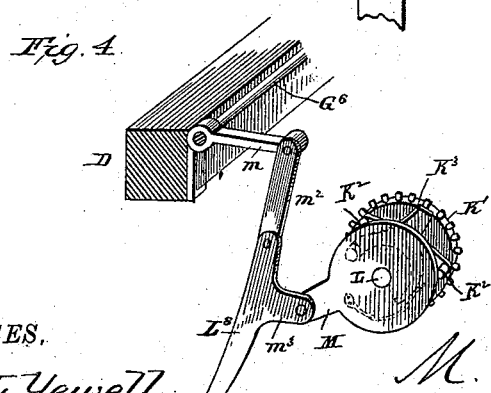
WITNESSES.
Edwin I. Yewell
Jos. A. Ryan
INVENTOR
M. L. Nichols
by Alex Mahon
Attorney.

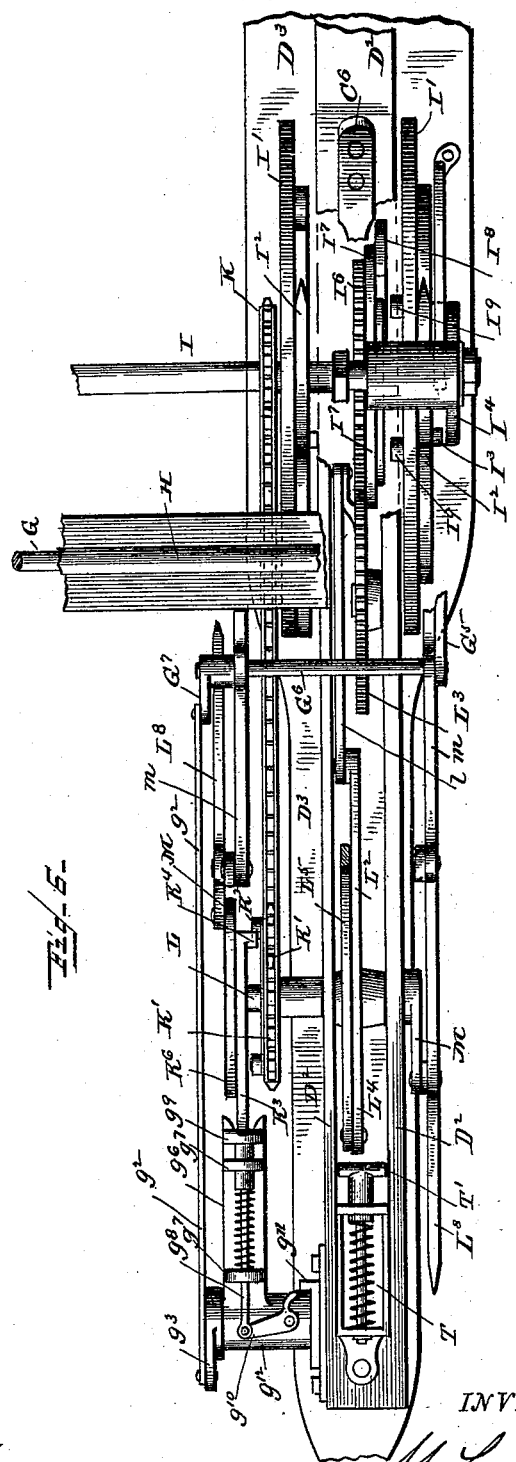

(No Model.) 10 Sheets—Sheet 5.

M. L. NICHOLS.
GRAIN BINDER.

No. 395,991. Patented Jan. 8, 1889.

WITNESSES
Edwin I. Yewell,
Joseph A. Ryan.

INVENTOR
M. L. Nichols
by Alex Mohun
Attorney.

(No Model.) 10 Sheets—Sheet 6.

M. L. NICHOLS.
GRAIN BINDER.

No. 395,991. Patented Jan. 8, 1889.

WITNESSES
Edwin L. Yewell,
Joseph A. Ryan.

INVENTOR.
M. L. Nichols
by Alex Mahon
Attorney.

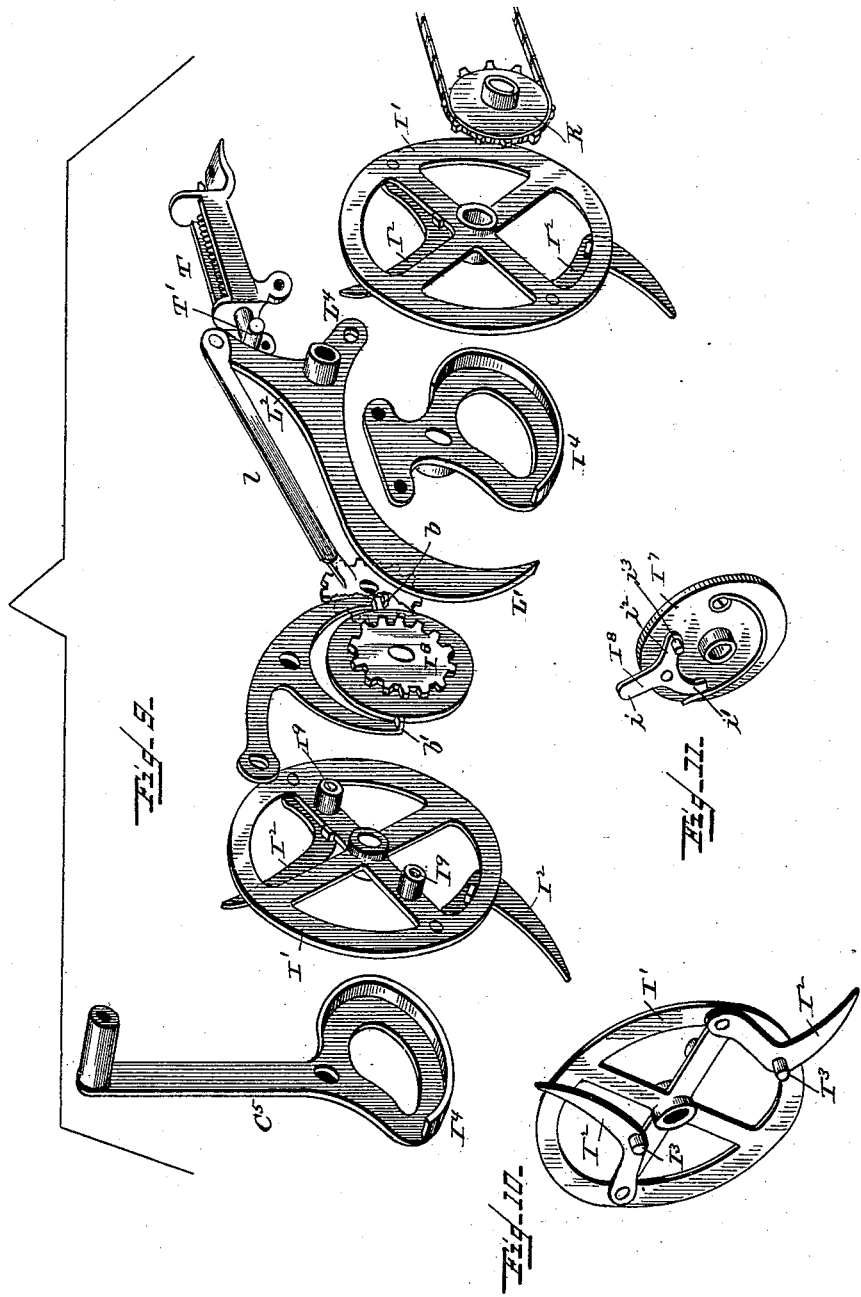

(No Model.)  10 Sheets—Sheet 8.
M. L. NICHOLS.
GRAIN BINDER.
No. 395,991. Patented Jan. 8, 1889.
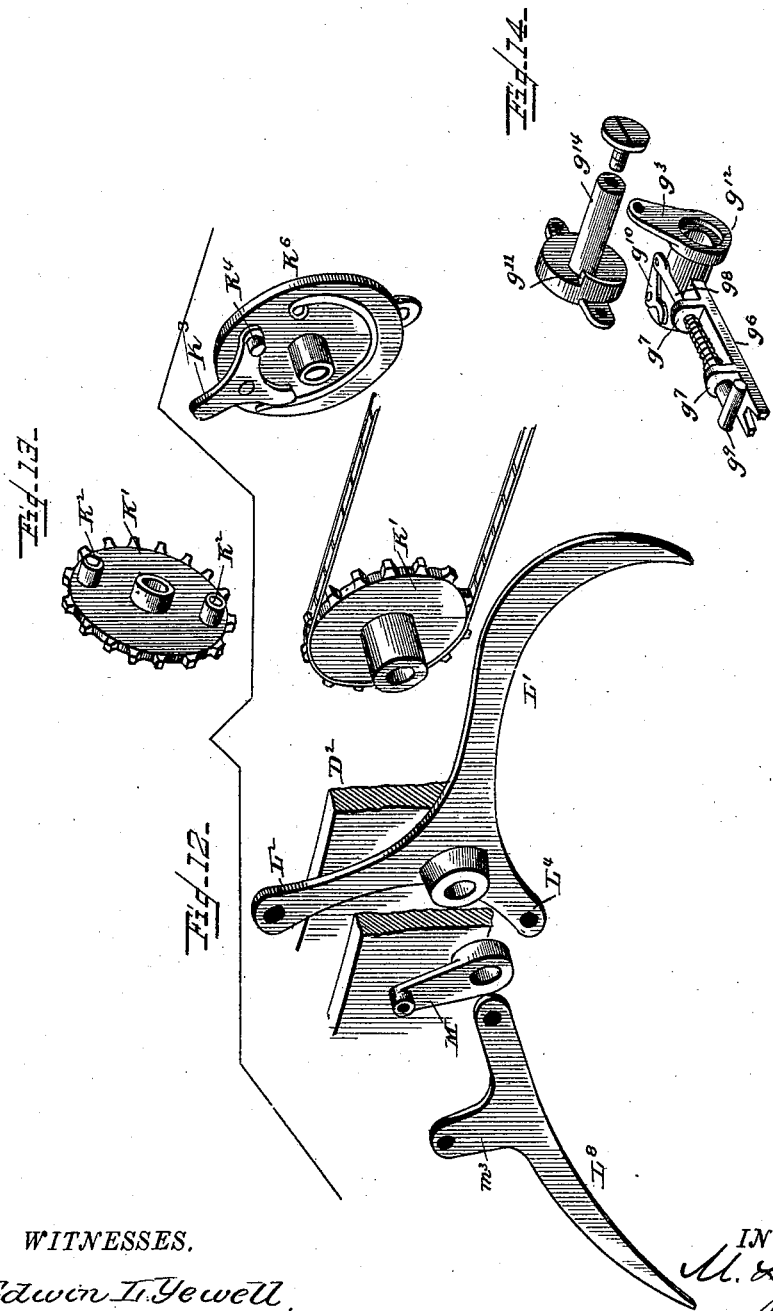
WITNESSES.
Edwin T. Yewell,
Joseph A. Ryan.
INVENTOR
M. L. Nichols
by Alex Mahan
Attorney.

(No Model.) 10 Sheets—Sheet 9.

M. L. NICHOLS.
GRAIN BINDER.

No. 395,991. Patented Jan. 8, 1889.

WITNESSES.
Edwin L. Yewell.
Joseph A. Ryan.

INVENTOR,
M. L. Nichols
by Alex Mahon
Attorney (No Model.)  M. L. NICHOLS.  10 Sheets—Sheet 10.
GRAIN BINDER.
No. 395,991.   Patented Jan. 8, 1889.
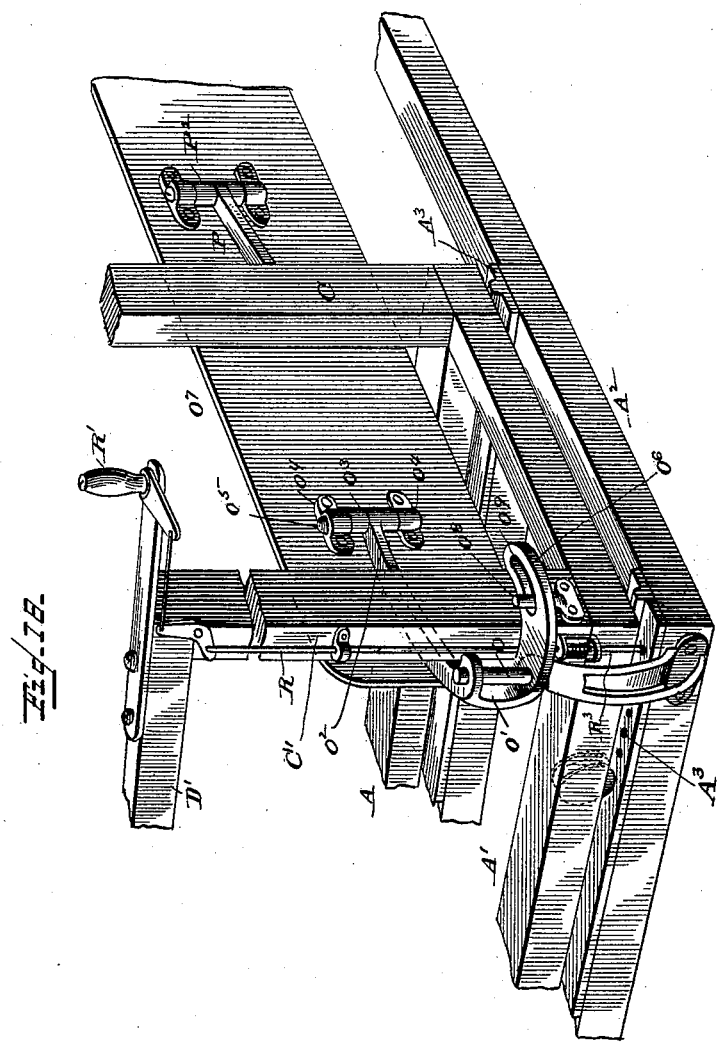
WITNESSES
Edwin T. Yewell,
Jos. A. Ryan
INVENTOR
M. L. Nichols
by Alex Mahon
Attorney.

UNITED STATES PATENT OFFICE.

MARION L. NICHOLS, OF NEW YORK, N. Y., ASSIGNOR TO THE NICHOLS HARVESTER COMPANY, OF SAME PLACE.

GRAIN-BINDER.

SPECIFICATION forming part of Letters Patent No. 395,991, dated January 8, 1889.

Application filed October 8, 1887. Serial No. 251,787. (No model.)

*To all whom it may concern:*

Be it known that I, MARION L. NICHOLS, of the city, county, and State of New York, have invented certain new and useful Improvements in Grain-Binders, of which the following is a full and exact description, reference being had to the accompanying drawings, making part of this specification.

My invention relates to improvements in grain-binders, and particularly to improvements upon that described in an application filed by me January 11, 1887, Serial No. 224,024.

My invention consists in the combination, with the packers which deliver the grain to the grain-receptacle, of the auxiliary intermittently-operating packers and an intermittently-operating separator acting to force the grain backward away from the main packers.

It further consists in the combination, with intermittently-operating packers and the intermittently-operating separator, of a trip mechanism acted upon and controlled by the grain accumulated to form the bundle and acting to throw the packer-operating mechanism out of action and the separator-arm-actuating mechanism into action.

It further consists in the combination, with intermittently-operating packers, of a trip to control the binding mechanism acted upon and controlled by the action of the packers.

It further consists in the combination, with a separator acting through mechanism to control the binder mechanism, of intermittently-operating packers acting through mechanism to control the separator and its actuating mechanism.

It further consists in the combination, with the movable binder-mechanism frame, of the header-board connected therewith through a hinge-connection and means for imparting an accelerated movement thereto in moving the binder-frame.

It further consists in certain other novel combinations and arrangement of parts, all as hereinafter described.

Figure 2:
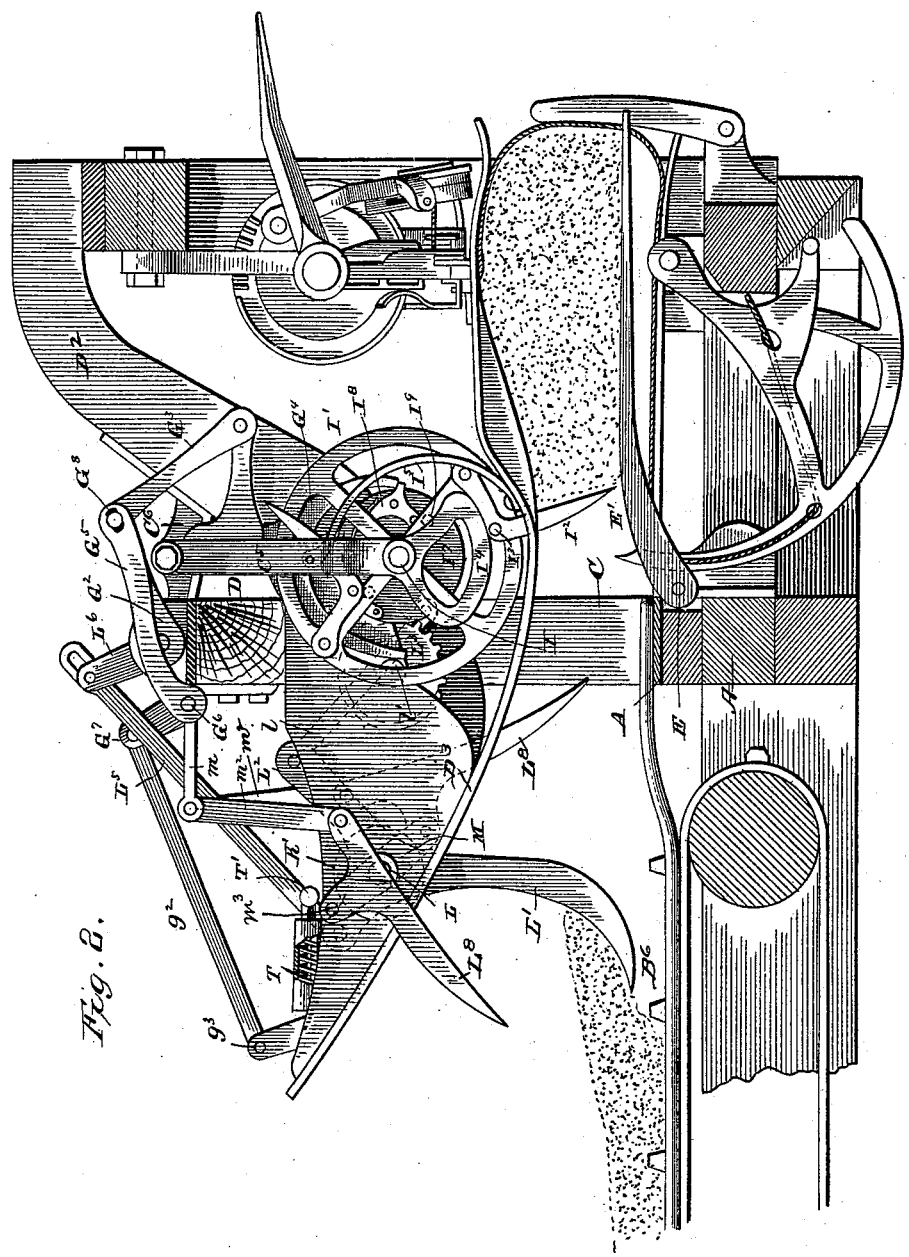
Figure 7:
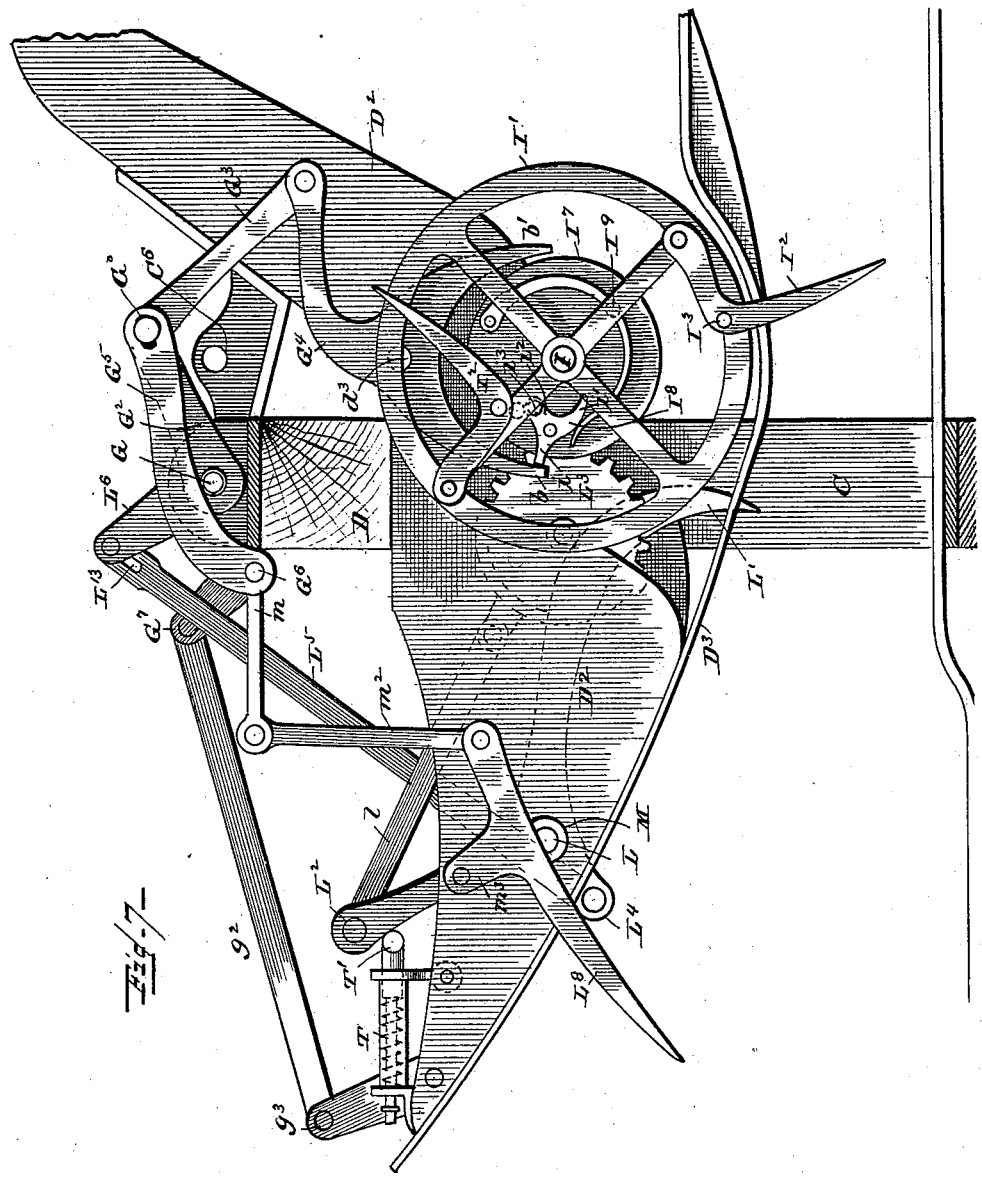
Figure 8:
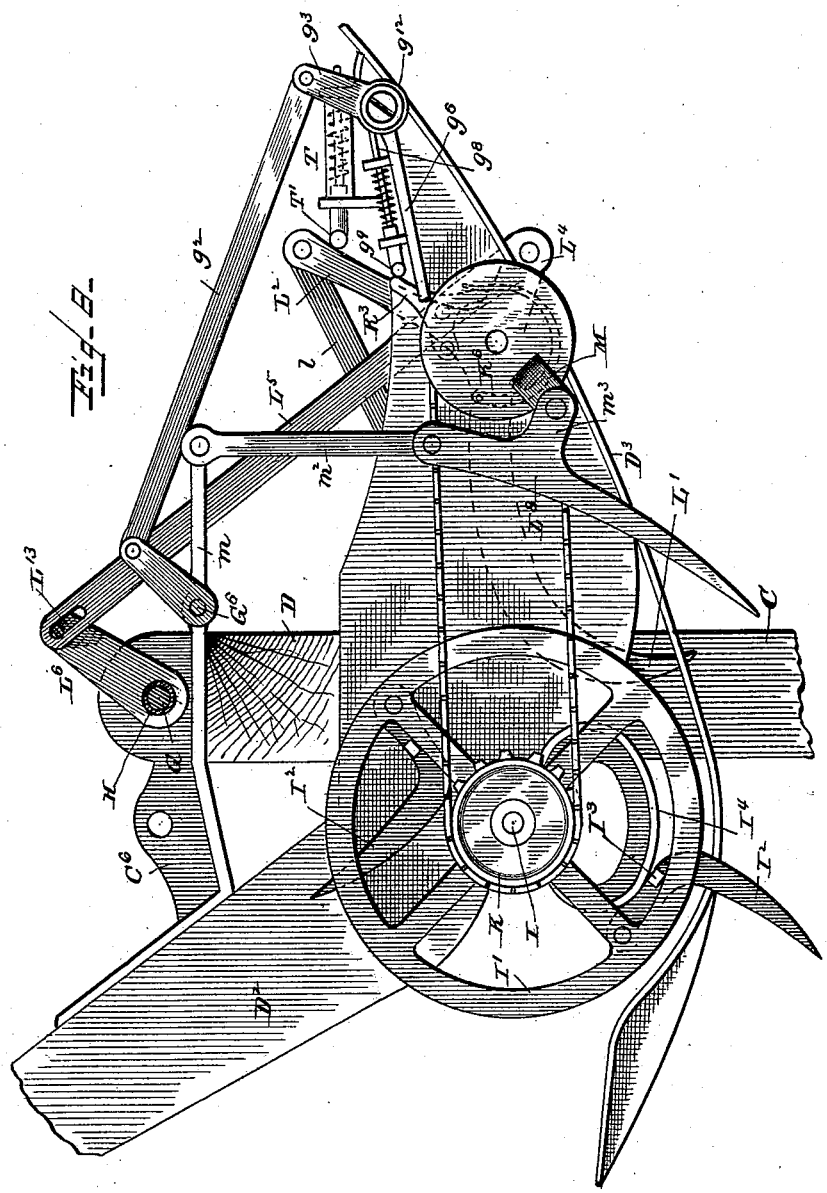
Figure 17:
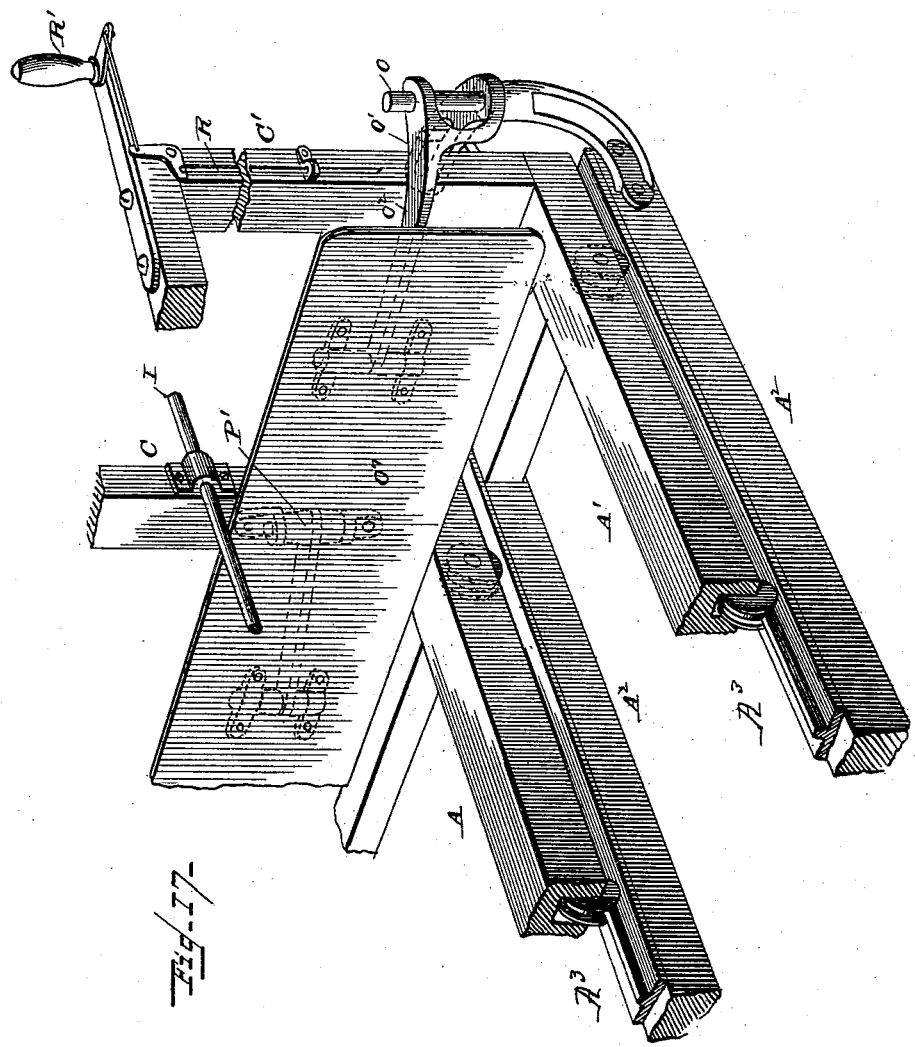

In the accompanying drawings, Figure 1 is a skeleton perspective view of the trip mechanism, showing the auxiliary packers. Fig. 2 is a longitudinal section through the frame in front of the binding devices, showing the binding devices thrown into action and the auxiliary packers thrown out of action. Fig. 3 is a top view of the auxiliary packers and the separator, showing the mechanism for imparting motion thereto. Fig. 4 is a perspective view of one of the auxiliary packers, showing the mechanism for imparting motion thereto. Fig. 5 is a side view of the separator-arm with its spring for taking up the slack of its operating-clutch and holding it out of contact with the friction-roller by which it is driven when at rest. Fig. 6 is a plan or top view of the cross-bar, showing the separator, the main and auxiliary packers, and the mechanism for imparting motion thereto, with a portion of the parts broken away. Fig. 7 is an enlarged side view of Fig. 2 with the knotting mechanism removed and the separating-arm in its position of rest, and with the cam or track for controlling the outer main packers removed. Fig. 8 is a view taken from the opposite side, showing the means for operating the auxiliary packers. Fig. 9 is a perspective view of the several parts which are located on the main driving or packer shaft for communicating motion to and controlling in part the main and auxiliary packers and separator-arm, also showing said separator. Fig. 10 is a perspective view of the outer packer-wheel, taken from the reverse side to that shown in Fig. 9. Fig. 11 is a perspective view of the separator-driving pinion, also taken from the reverse side to that shown in Fig. 9. Fig. 12 is a perspective view of the separator-arm, one of the auxiliary packers, and a portion of their driving mechanism. Fig. 13 is a perspective view of the reverse side of the sprocket-wheel shown in Fig. 12. Fig. 14 is a detail perspective view of the several parts of the rocking arm for disconnecting the auxiliary packer-clutch and completing the movement of the bifurcated or forked arm. Figs. 15 and 16 are side and face views of the sprocket-wheel and disk and pinion, disk, and pawl on the main packer-shaft through which motion is communicated to the binding mechanism. Fig. 17 is a front perspective view of a portion of the harvester and binder mechanism frame and the header-board, showing the mechanism for imparting an accelerated motion thereto. Fig. 18 is a rear perspective view of the same.

The main and auxiliary packers, the separator, the trip mechanism, and knotting mechanism are mounted in the binder-frame, which consists of the sill-bars A A′, end bars, B, (only one being shown,) posts C C′, upper or connecting bars, D D′, and intermediate slotted cross-bar, $D^2$, to which the breast-plate $D^3$ is connected, constituting the movable binder-mechanism frame, and which is mounted upon an extension, $A^2$, of the main or harvester frame adjacent to the carrier and adapted to be adjusted thereon to provide for long and short grain in a manner that will be readily understood.

In suitable bearings, $a$ $a$, one at the end and the other about centrally of said binder-frame on the sill-bar A, is mounted the grain-trip-arm rock-shaft E, which has mounted on one end the trip arm or finger E′, to be acted upon by the grain accumulated to form the bundle, and on the other a crank-arm, $E^2$, said crank-arm being in turn connected with an upright arm or lever, $E^3$, mounted in suitable bearings, $E^4$, in a support, $E^5$, extending between the posts C C′ of the frame.

The arm or lever $E^3$ has pivoted to it a lever, F, which is also pivoted at $E^6$ in the support $E^5$, and this lever F carries on its outer end a friction-roller, $f$, to engage and be engaged by internal and external cam-faces, $f'$ $f^2$, formed upon or connected with the binding-mechanism drive-wheel $F^2$, and by means of which the lever F, and through it the trip mechanism, is held after being thrown into action positively during the time the tying mechanism is in action, as hereinafter described.

The lever F has connected to it at a point between its pivotal point $E^6$ and its point of connection with the upright arm $E^3$ a spiral spring, $e$, which at its upper end is connected with a screw-threaded rod, $e^2$, mounted in a bearing, $e^3$, secured to the support $F^5$, and which rod has mounted thereon a thumb-nut or handle, $e^4$, by which the tension of the spring on the lever F may be regulated, and through the crank-arm $E^2$, rock-shaft E, and finger E′ to regulate the size of the bundle by the tension exerted thereon by the spring.

In suitable bearings, $d$ $d'$, on the top of the upper connecting bar, D, is mounted a rock-shaft, G, having at one end a crank-arm, G′, which arm is connected to the upright arm $E^3$ through a link, $G^x$, the other end having mounted upon it a crank arm, $G^2$, connected through a link, $G^3$, with a bifurcated or forked arm, $G^4$, pivoted at $d^3$ to the cross-bar $D^2$. This bifurcated arm has lugs $b$ $b'$ projecting inwardly from its lower ends, as hereinafter described. The link $G^3$ is also connected to a bent crank-arm, $G^5$, which is in turn connected with a rock-shaft, $G^6$, mounted in a suitable bearing, $g$. The rock-shaft $G^6$ carries on its opposite end a crank-arm, $G^7$, which in turn is connected through a link, $g^2$, with the sleeve $g^{12}$ of a rocking arm, $g^3$, mounted upon a stud-shaft, $g^{14}$, connected to the cross-bar $D^2$ near the forward end of the same, as hereinafter referred to.

In the bearings $d$ $d'$ and surrounding the shaft D is a hollow shaft, H, provided on one end, or that adjacent to the lever $E^3$, with a crank-arm, $h$, which is connected through a link, $h'$, with an angular frame, H′, straddling the arm $E^3$ below the point of connection therewith of the lever F, and which frame is pivoted at $f^3$ in the support $E^5$. One arm of this frame, and parallel with the arm through which it is connected with the link $h'$, extends into close proximity to the disk of the gear-wheel $h^9$ on a shaft, I, and is provided with a lug or projection, $h^3$, to engage the arm $h^4$ of the rocking pawl $h^5$ on the disk $h^{10}$ of the gear $h^9$ on the shaft above referred to, and for a purpose hereinafter explained.

A shaft, I, which communicates motion to the main packers, auxiliary packers, and separator, is mounted at one end in bearings $n$, connected to the post C, and at the other end in a hanger, $C^5$, depending from and supported by a bracket, $C^6$, extending between the cross-bar $D^2$ and the bar D. This shaft I extends parallel with the shaft E and has loosely mounted upon it near one end a pinion, $I^6$, having a disk or plate, $I^7$, secured thereto and carrying on its outer face a rocking spring-pawl, $I^8$. This pawl is provided with arms $i$ $i'$ $i^2$, from one of which projects a lug, $i^3$. On the shaft I are rigidly secured the packer-wheels I′, from the inner face of the outer one of which project friction-rollers $I^9$ to engage the lug $i^3$ of the pawl $I^8$, and through which engagement to cause the pinion to be engaged with its shaft is accomplished. Upon the opposite end of this shaft I is mounted a sprocket-wheel, $h^6$, having an enlarged hub or disk, $h^7$, formed therewith, and from the outer face of which disk project friction-rollers $h^8$, and adjacent to this wheel the shaft I has loosely mounted upon it a pinion, $h^9$, also having a hub or disk, $h^{10}$, formed thereon, and on which disk is pivoted a rocking spring-pawl, $h^5$, having an arm, $h^4$, from which projects a lug, $h^{11}$. The pinion $h^9$ transmits motion when engaged with its shaft to the main binder-mechanism gear $F^2$ through an intermediate pinion, F′, mounted in bearings $F^5$ in the support $E^5$.

The packer-wheels, which are mounted on the shaft I on each side of the cross-bar $D^2$, have pivoted to them the angularly-formed packing arms or fingers $I^2$. These arms are pivoted upon the side faces near the periphery of the wheels and have at their points of angle projecting therefrom on both sides lugs $I^3$ to engage a cam or track way, $I^4$, formed with or secured on one side to the depending arm $C^5$ and on the other side to the bar $D^2$.

Tracks $I^5$ are connected to the breast-plate $D^3$ and to the depending arm or support $C^5$ on one side and to the cross-bar $D^2$ on the other, and are curved on the arc of a circle of which a point about equally distant between the shaft I and the outer edge of the cam $I^4$ is the center, and said tracks the one I⁴ serving to guide the packer-arms and cause them to force the grain into the binding-receptacle, and the other, I⁵, serving to guide and draw the arms back within the compass of the wheel after leaving the track I⁴ and prevent the arms from moving loosely. The shaft I has also mounted upon it a sprocket-wheel, K, keyed thereto, and from which motion is communicated to a sprocket-wheel, K′, for operating the auxiliary packers, in a manner hereinafter described.

A shaft, L, parallel with the shaft G⁶, is arranged in front thereof and at a point over the inner end of the carrier or apron B⁶, and has mounted upon it the separator-arm L′. This arm has an extension or arm, L², which is connected through a link, l, with the pinion L³, and in the movement of the pinion acting through the connecting-arm l to force the separator-arm outward toward the carrier to catch and hold the incoming grain and divide it from that accumulated to form the bundle.

An arm, L⁴, extends from the separator-arm at right angles to the arm L² and has connected to it a link, L⁵, which extends back and is connected to a crank-arm, L⁶, keyed or otherwise rigidly secured to the hollow shaft H, and through such connection to rock said shaft as the separator is thrown forward, and through the crank-arm h and link h′ to rock or depress the frame H′ on its pivot and disengage it from the arm h⁴ of the rocking pawl h⁵. The link L⁵ is provided with an elongated slot, L¹³, at its point of connection with the crank-arm L⁶, which slot is for the purpose of permitting the separator-arm to move nearly the full extent of its throw in acting upon the grain before the link L⁵ acts on the crank-arm L⁶ to cause it to act through its connection to disengage the frame H′ from the pawl to permit the binding mechanism to be thrown into action. The shaft L extends out upon both sides of its support and has mounted on each end a crank-arm, M, to which the auxiliary packers L⁸ are connected and through which they are operated. Bearings m m extend out from the frame D, and to which are pivoted the depending link-arms m², which in turn are connected to the upper end of the auxiliary packers L⁸, the crank-arms M being connected to a lug, m³, extending from the rear face, and by which construction and arrangement of parts a reciprocating motion is imparted to the packers in the following manner: On the shaft L is loosely mounted the sprocket-wheel K′, from the outer face of which project friction-rollers K². The shaft L has also mounted thereon, but rigidly secured thereto, a wheel or disk, K⁶, carrying a rocking pawl, K³, having an outwardly-projecting lug, K⁴, and by the engagement of the lug with the friction-rollers K² to engage the sprocket-wheel with its shaft and cause said wheel to revolve the shaft and operate the auxiliary packers, the movement being transmitted to the sprocket-wheel K′ from a sprocket-wheel, K, on the shaft I. The sleeve $g^{12}$ of the rocking arm $g^3$ has extending from it an arm, $g^6$, having its forward end slotted, and which arm is of such length as to permit it to engage the pawl K³, as hereinafter described. In suitable bearings, $g^7$, of this arm $g^6$ is mounted a spring-rod, $g^8$, provided at one end with a cross-head, $g^9$, and at the other, or that adjacent to the sleeve $g^{12}$, with a pawl or dog, $g^{10}$, which dog is adapted to engage a lug or projection, $g^{11}$, formed upon the hub of the stud-shaft $g^{14}$, on which the sleeve $g^{12}$ is mounted.

The operation of the devices for controlling the auxiliary packers through the trip mechanism and the means for controlling the separator and binding mechanism through the tripping of the auxiliary packers are as follows: The shaft I receives motion from the sprocket-wheel $h^6$, mounted thereon and driven from the main driving-shaft of the harvester in any preferred way and imparting a continuous motion to said shaft, and the auxiliary intermittently-operated packers are caused to operate to take the grain from the apron or carrier and carry it into reach of the main continuously-operated packers, which act to force and pack the grain into the receptacle and upon the trip-arm. When a sufficient quantity of grain has accumulated in accordance with the predetermined amount for which the trip has been set to act by the spring e, screw-rod $e^2$, and thumb-nut $e^4$, before described, as the trip-arm is depressed it rocks the shaft E and by its connection through the arm E³, with the shaft G, to rock it also, and by the rocking of which through the crank-arm G² and link G³, to cause the bifurcated or forked arm G⁴ to be nearly disengaged from the pawl I⁸. In this movement the crank-arm G⁵, acting on the rock-shaft G⁶, crank-arm G⁷, link $g^2$, and arm $g^3$, rocks the arm $g^6$ and causes the same to be moved into the path of the pawl K³. The auxiliary packers continue to work until the wheel K⁶, carrying the pawl K³, completes its full revolution, which will bring the pawl into engagement with the arm $g^6$. When the pawl K³ engages the cross-head $g^9$, acting through its rod, it causes the dog $g^{10}$ to be disengaged from the lug $g^{11}$, which engagement to this time has caused it to hold the separating-trip mechanism from being thrown into action. The arm $g^6$ being now released by the disengagement of the dog $g^{10}$ from the lug $g^{11}$, the arm $g^6$ is still further depressed, and serves, through the arm $g^3$, link $g^2$, crank G⁷, shaft G⁶, and bent crank-arm G⁵, and link G³, to still further rock the bifurcated arm and completely release the pawl I⁸ from its engagement therewith.

The means for permitting the two rock-shafts G and G⁶, which act on the bifurcated arm G⁴ through the crank-arm G² and bent crank-arm G⁵, and consequently about different centers, to impart the two movements to said arm G⁴ is provided for by elongating the bearing-slot in the bent crank-arm G⁵, as shown at G⁸, which compensates for the variation in the movements of the crank-arms. When the pawl I⁸ is disengaged from the bifurcated arm, the lug $i^3$ is caused to engage the friction-roller I⁹ on the packer-wheel to clutch the pinion to the packer-wheel and to revolve therewith. When the pinion has made a half-revolution, the pawl will be engaged by the lug $h'$ on the opposite arm of the bifurcated arm which has by its rocking movement to release the pawl from the lug $h$ on one side been brought into position to engage it on the other and throw said pawl out of engagement with the friction-roller I⁹. In the movement of the pinion I⁶ it communicates motion to the pinion L³, which in its revolution, acting through the connecting-arm $l$, forces the separator outward to catch the incoming grain and divide it from that accumulated to form the bundle. The pinions I⁶ and L³ are always in mesh, but at each action above described perform but half-revolutions, one to depress the separator and the other to raise the same, as will be readily understood.

The first movement caused by the engagement of the pawl K³ with the arm $g^6$ is to throw the auxiliary packers entirely out of action, and as the pawl K³ always engages the shipping mechanism at the same point one of the packer-arms is always caused to fully complete its movement of forcing the grain toward the main packers. As the separator-arm is depressed, it acts through its extension L⁴, link L⁵, and crank-arm L⁶ on the hollow shaft II, with which it is connected, rocking said arm, and through its connecting-link $h'$ to rock or depress the frame H' and disengage the arm $h^3$ from the rocking pawl $h^4$, which up to this time by its engagement therewith held the lug $h^{11}$ thereon out of engagement with the friction-roller $h^8$ on the disk $h^7$ of the sprocket-wheel $h^6$, and through such disengagement to permit the lug on the pawl to be thrown into the path of the friction-roller $h^8$ and engage the pinion $h^9$ with the shaft I, and through the pinion F' transmit motion to the main binder-mechanism drive-wheel.

Before the tripping mechanism is brought into action the friction-roller on the nose of the lever F rests on the narrowest portion of the external cam-face, $f'$; but when the arm E³ is drawn down by the action of the rock-shaft E through the crank-arm E², acted upon by the grain-trip finger, it raises the friction-roller on the lever F from off the cam-face $f'$, and when the pinion $h^9$ is engaged with the sprocket-wheel $h^6$, as above stated, it communicates motion to the main binder-mechanism drive-wheel through the intermediate pinion, F'. As the main drive-wheel revolves, the enlarged or raised portion of the cam $f'$ is caused to engage the lever F and hold it in its elevated position until the process of tying is completed. The internal cam-face then engages the friction-roller, forcing it into or against the depressed portion of the cam-face $f'$ and guiding it into its position of rest, the action of the raised portion of the cam-face being to hold lever F against the tension of the spring $e$, and consequently the arm or lever E³, and, through the connections before referred to, to also hold the bifurcated arm in the position it has been swung in the tripping process to release the pawl I⁸ on one side and allow it to engage the pinion I⁶ with the packer-wheel, and through the pinion L³ and link $l$ to depress the separator, as before stated, and the action of the internal cam-face, $f'$, being to assist the spring $e$ in raising the lever F to its normal position or make its action positive, and through the connections before described acting on the bifurcated or forked arm G⁴ through the arm or lever E³ and the intermediate connections to return the same to its original position, again releasing the pawl I⁸ and engaging the gear I⁶ with the packer-wheel and completing the revolution of the gears, and consequently returning the separator to its normal or position of rest.

From the foregoing it will be seen that the grain-trip arm acts to throw the auxiliary packers out of action and through them to throw the separator into action, and that by means of the dog acted upon by the pawl of the auxiliary packers the binder-mechanism trip cannot under any circumstances be thrown into action until the auxiliary packers have stopped and the separator has moved backward to arrest and hold the incoming grain—a feature which has in practice been found to be very important.

The means for imparting an accelerated movement to the header-board in adjusting the binder-frame to provide for long and short grain is as follows: Projecting from the harvester-frame A² and bolted thereto is a vertical pivot-pin, O, on which is mounted a U-shaped rocking arm, O', one portion, O², of which is extended in length and has on its outer end a vertical sleeved portion, O³, said end being connected to the header-board O⁷ through lugs or ears O⁴ and a pivot-pin, O⁵. Bolted or otherwise secured to the rear face of the post C' is a vertically-arranged pin or standard, O⁸, which engages an elongated curved slot, O⁹, in the arm O⁶ of the U-shaped rocking arm. To the post C is pivoted an arm, P, at P', which arm is in turn pivoted to the header-board O⁷ at P² in a similar manner to the part O² of the rocking arm O'.

The binder-mechanism-supporting frame is adapted to travel on a trackway, A³, on the projecting portion A² of the harvester-frame, and is held in any of its adjusted positions by means of a locking spring-bolt, R³, of any preferred form, connected to a rod, R, which in turn is connected through a bell-crank lever with a handle, R', mounted on the frame-bar D' of the binder-frame, as shown and described in Letters Patent granted me April 10, 1888, No. 381,079.

The operation of the parts is as follows: When it is desired to change the relation of the binder-frame to the carrier, the driver releases the locking-bolt through the handle R' and pushes the binder-frame forward, and by which movement the pin or standard O⁸, acting in the slot O⁹ of the short arm of the U-shaped rocking arm O', acting on the long arm O², causes the header-board to be carried forward at an accelerated speed, the arm P simply acting as a support for the header at its point of connection.

By the construction above described it will be observed that as the binder-mechanism frame is moved forward to provide for short grain the header-board is caused to maintain a position relative to the needle about equal to the distance between the needle and the line of the cutter-bar, and consequently insure the tying of the grain about centrally, as will be readily understood.

Mounted in the supporting-bar D² and in rear of the separating-arm is a sliding spring-bolt, T, having a cross-head, T', at its free end, against which the arm L² of the separator is forced when in its position of rest, the object of which is to hold the pawl I⁸ firmly upon the lug $b$ of the bifurcated rocking arm, such result being accomplished by the pressure of the spring-bolt T, acting through the link $l$, at a point above the center of the pinion I⁶ in the direction of its travels, causing said pinion to have a pressure exerted thereon in the direction of its travel, and consequently hold the pawl I⁸, mounted upon the disk I⁷, in rigid contact with the lug $b$ on the bifurcated arm and entirely out of engagement with the friction-roller I⁹ on the packer-wheel I' and allow the same to revolve freely.

Having thus described my invention, what I claim, and desire to secure by Letters Patent, is—

1. The combination of packers which deliver the grain to the grain-receptacle, the auxiliary intermittently-operating packers, and an intermittently-operating separator acting to force the grain backward away from the main packers, substantially as described.

2. The combination of the packers which deliver the grain to the grain-receptacle, the intermittently-operating packers, an intermittently-operating separator, and a grain-trip arm controlled by the grain accumulated to form the bundle, acting to throw the packer-operating mechanism out of action and the separator-arm-actuating mechanism into action.

3. The combination of the binder, the intermittently-operating packers, a binder-trip for throwing the binding devices into action, and intermediate mechanism between said trip and the intermittently-operating packers, whereby the stopping of the packers causes through the intermediate mechanism the starting of the binder.

4. The combination of the separator, mechanism for actuating the same, said separator connected with the binder-trip to control the action of the binding devices, and intermittently-operating packers connected to the separator-actuating mechanism, substantially as described, whereby the packers act to control the action of the separator, as set forth.

5. The combination of a grain-trip arm connected with the packer-trip arm to control the action of the intermittently-operating packers to throw the same out of action, a separator, a trip for controlling the action of the separator intermediate between the packers and the separator and acted upon by the intermittently-operating packers, and a binder-trip connected with the separator to be acted upon and controlled thereby, substantially as described.

6. The combination, with intermittently-operated packers, a trip-arm therefor, a separator, a trip therefor, and a trip-arm controlled by the grain accumulated to form the bundle and acting upon both the packer and separator trips, of mechanism connecting the separator and packer trips together, substantially as described, whereby the grain-trip arm shall act upon the packer-trip arm, and in connection with the packer-trip arm also upon the separator-trip, as set forth.

7. The combination of the grain-trip arm acted upon and controlled by the grain accumulated to form the bundle, the gear-wheel for operating the binding devices, a lever, F, acted upon by the grain-trip arm, and a hub and cam on the gear-wheel for engaging the lever, substantially as and for the purpose set forth.

8. The combination of intermittently-operating packers, a clutch for engaging said packers with their operating-shaft, a packer-trip arm acting to throw the packers out of action, and a locking-dog on the packer-trip arm acting on said packer-clutch, substantially as described, whereby the dog is caused to lock and hold the trip-arm until engaged with the clutch holding the packers in action, as set forth.

9. The combination of intermittently-operating packers, a clutch for engaging said packers with their operating-shaft, a packer-trip arm acting to throw the packers out of action, a grain-trip arm acted upon by the grain accumulated to form the bundle to throw the packer-trip arm into the path of the pawl of the clutch, a separator, a separator-trip, and a locking-dog mounted upon and acting on the packer-trip arm, substantially as described, whereby the separator-trip is held from being thrown into action until the packer-trip arm is engaged by the pawl of the clutch and the packers thrown out of action, as set forth.

10. The combination of the packers, the clutch for engaging the same with their operating-shaft, the pawl of said clutch, a swinging packer-trip arm mounted on the packer-frame to engage the pawl to throw the packers out of action, and a dog mounted on the swinging packer-trip arm in position to be acted upon by the pawl of the clutch to release the dog, substantially as and for the purpose set forth.

11. The combination of the packers, the clutch for engaging the same with their operating-shaft, the pawl of said clutch, a separator, mechanism for throwing the same into and out of action, a swinging packer-trip arm mounted on the packer-frame, a dog mounted on the swinging packer-trip arm to engage the pawl of the packer-clutch, substantially as described, whereby the packers are thrown out of action as the separator is thrown into action, as set forth.

12. The combination of the separator, the gearing for operating the same, the clutch for engaging the separator with its actuating mechanism, the pawl of said clutch, and a spring-bolt mounted on the separator-supporting frame to engage the arm of the separator, substantially as described, whereby the pawl of the clutch is held out of contact with the friction-rollers carried by the driving-shaft when the separator is at rest, as set forth.

13. The combination of the harvester-frame, the binder-frame mounted and adapted to move thereon, and a pivoted swinging lever mounted on the harvester-frame and connected with both the header-board and the binder-frame, so that an accelerated movement is imparted to the header-board by the movement of the binder-frame, as set forth.

14. The combination of the harvester-frame, the binder-frame mounted and adapted to move thereon, a pivoted swinging lever mounted on the harvester-frame, having one long and one short arm, a header-board connected to the long arm, and a connection between the short arm and the binder-frame, whereby an accelerated movement is imparted to the header-board by the movement of the binder-frame, as set forth.

15. The combination of the harvester-frame, a movable binder-frame, the pivot-pin on the harvester-frame, the pivoted swinging lever having one long and one short arm and mounted to oscillate on the pin, and its long arm connected to the header-board and its short arm slotted and engaging a pin on the binder-frame, substantially as described.

MARION L. NICHOLS.

Witnesses:
ALEX. MAHON,
M. P. CALLAN.